(12) United States Patent
Zimmanck et al.

(10) Patent No.: US 11,594,951 B2
(45) Date of Patent: Feb. 28, 2023

(54) METHOD AND APPARATUS FOR RAPID SHUTDOWN OF ISLANDABLE INVERTERS USING OPEN CIRCUIT DETECTION

(71) Applicant: Enphase Energy, Inc., Petaluma, CA (US)

(72) Inventors: Donald Richard Zimmanck, Sebastopol, CA (US); John Scott Berdner, Grass Valley, CA (US)

(73) Assignee: Enphase Energy, Inc., Petaluma, CA (US)

( * ) Notice: Subject to any disclaimer, the term of this patent is extended or adjusted under 35 U.S.C. 154(b) by 73 days.

(21) Appl. No.: 17/348,708

(22) Filed: Jun. 15, 2021

(65) Prior Publication Data

US 2021/0391783 A1 Dec. 16, 2021

Related U.S. Application Data

(60) Provisional application No. 63/039,446, filed on Jun. 15, 2020.

(51) Int. Cl.
*H02M 1/36* (2007.01)
*H02J 3/38* (2006.01)
*H02M 1/32* (2007.01)

(52) U.S. Cl.
CPC .............. *H02M 1/36* (2013.01); *H02J 3/388* (2020.01); *H02M 1/32* (2013.01)

(58) Field of Classification Search
CPC ............. H02M 1/32; H02M 1/36; H02J 3/388
USPC .......................................................... 363/55
See application file for complete search history.

(56) References Cited

U.S. PATENT DOCUMENTS

| 10,186,867 | B2 * | 1/2019 | Premm | ................... H02M 7/44 |
| 2016/0241032 | A1 * | 8/2016 | Zimmanck | ................ H02J 3/14 |
| 2019/0079475 | A1 * | 3/2019 | Zimmanck | ................ H02J 3/14 |
| 2021/0249860 | A1 * | 8/2021 | Moore | ....................... H02J 3/14 |

* cited by examiner

*Primary Examiner* — Yemane Mehari
(74) *Attorney, Agent, or Firm* — Moser Taboada

(57) ABSTRACT

A method and apparatus for autonomous rapid shut-down of a power conditioner. In one embodiment, the method comprises determining an amount of active and reactive current generated by a power conditioner; determining whether the amount of active and reactive current satisfies an open circuit threshold; and initiating, when the amount of active and reactive current satisfies the open circuit threshold, deactivation of the power conditioner.

18 Claims, 4 Drawing Sheets

METHOD AND APPARATUS FOR RAPID SHUTDOWN OF ISLANDABLE INVERTERS USING OPEN CIRCUIT DETECTION

RELATED APPLICATIONS

This application claims benefit to U.S. Provisional Patent Application Ser. No. 63/039,446, filed 15 Jun. 2020 and entitled "Rapid Shutdown of Island-able Inverters Using Open-Circuit Detection" which is hereby incorporated herein in its entirety by reference.

BACKGROUND OF THE INVENTION

Field of the Invention

Embodiments of the present disclosure relate generally to rapid shutdown of power conditioners and, in particular, to rapid shutdown of power conditioners without having to use anti-islanding or persistent communications.

Description of the Related Art

Rapid shutdown for inverters is required in the US by code and is typically required in the rest of the world for practicality. Unlike central inverters, microinverters have no direct centrally located interface. They are distributed devices which usually rely on communications to a central gateway for telemetry and control. This makes the design of a fail-safe centralized shutdown mechanism challenging. With grid-tied only microinverters, the microinverter anti-islanding algorithm can be used as a shutdown mechanism. With this method, when the microinverter system is disconnected from the grid via a switch or breaker, the anti-islanding algorithm forces the inverters to shut down. If the microinverters are designed to be used in island-able systems (i.e., systems that can run both on grid and off), the anti-islanding algorithm must be turned off while operating as part of an intentional island and, therefore, the anti-islanding can no longer be used as the sole means of shutting the microinverter down.

While communications can be used to shut down the microinverter, doing so in a fail-safe manner relies on periodically sending a "keep-alive" heartbeat, which decreases the reliability of the system when operating as an island as it would not be dependent on the communications link to keep the system powered on.

Therefore, there is a need in the art for a technique for reliably shutting down microinverters that does not rely on anti-islanding or persistent communications.

SUMMARY OF THE INVENTION

Embodiments of the present invention generally relate to a method and apparatus for autonomous rapid shut-down of a power conditioner without relying on anti-islanding or communications substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for triggering rapid shutdown of one or more power conditioners—such as microinverters—without relying on anti-islanding or communications. In various embodiments, each power conditioner detects open circuit conditions on the branch circuit to which it is coupled and shuts down in response to the detected open circuit condition. Since each power conditioner on a branch circuit autonomously and independently detects an open circuit condition and shuts down, a branch-level switch or circuit breaker can be used as a shutdown initiation device.

In some embodiments, the open circuit detection is accomplished by measuring the real/reactive current flow and determining if the corresponding phasor is left or right of an open circuit threshold boundary (i.e., whether the power conditioner is operating within or outside of an expected operating region). In one or more other embodiments, other types of open circuit detection schemes may be used.

Figure 1:
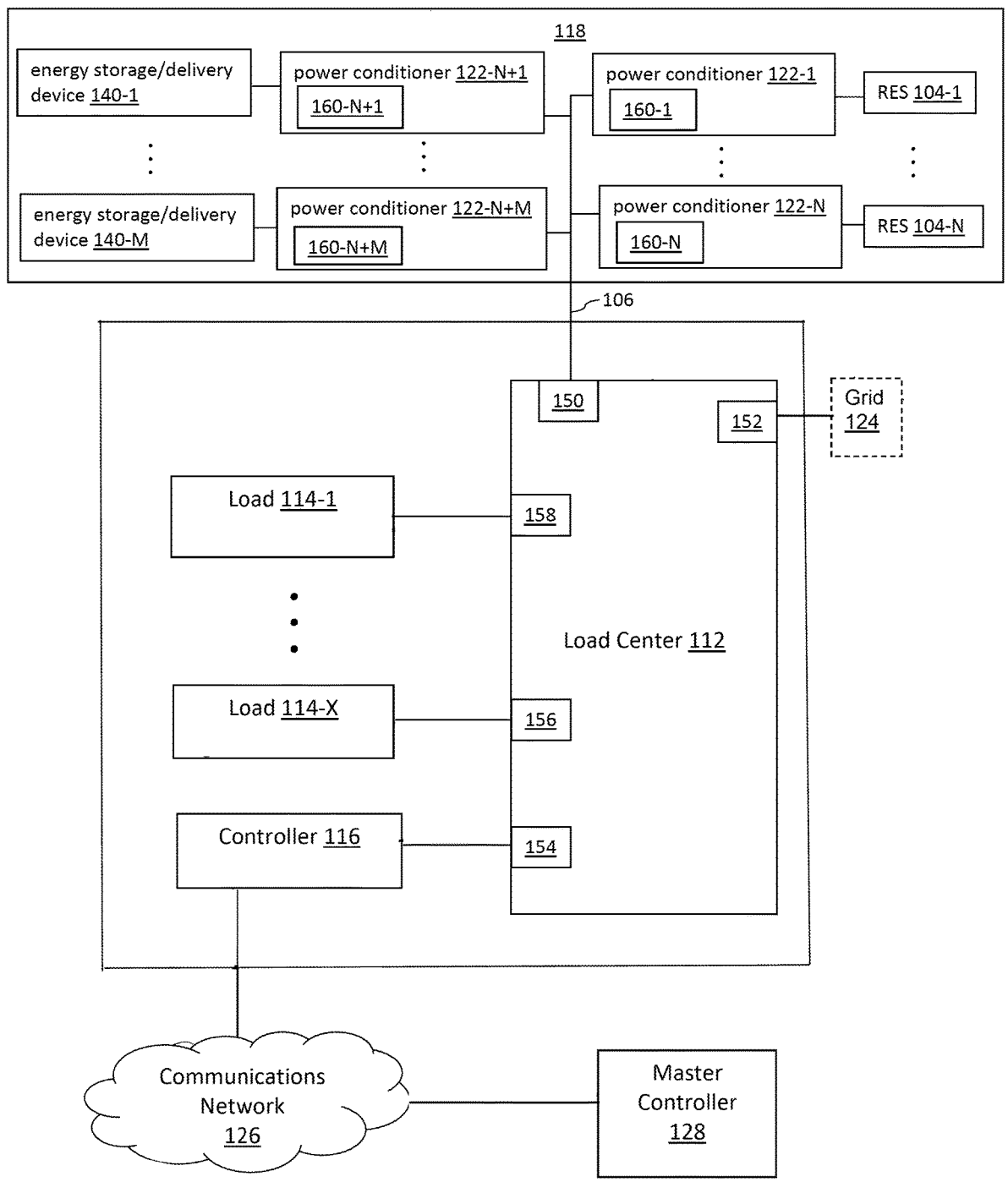
FIG. 1 is a block diagram of a system for power generation in accordance with one or more embodiments of the present invention.

FIG. 1 is a block diagram of a system 100 for power generation in accordance with one or more embodiments of the present invention. This diagram only portrays one variation of the myriad of possible system configurations. The present invention can function in a variety of environments and systems.

The system 100 comprises a building 102, such as a residential or commercial building, coupled to a distributed generator (DG) 118 and a power grid 124, such as a commercial power grid, via a load center 112. The DG 118 and the power grid 124 are coupled to the load center 112 via corresponding over-current protection devices (OCPDs) 150 and 152, respectively. A plurality of loads 114-1 . . . 114-X, which may be referred to as loads 114 (e.g., various types of appliances, motors, and the like), are coupled to the load center via corresponding OCPDs 158-1 . . . 158-X, and a DG controller 116 is coupled to the load center 112 via an OCPD 154.

The DG system 118 comprises a plurality of renewable energy sources (RESs) 104-1 . . . 104-N (which may be referred to as RESs 104) coupled to a plurality of power conditioners 122-1 . . . 122-N (which may be referred to as power conditioners 122) in a one-to-one correspondence; in some other embodiments, one or more of the power conditioners 122 may each be coupled to multiple RESs 104. In the embodiments described herein, the RESs 104 are photovoltaic (PV) modules, although in other embodiments they may be any type of renewable energy source that provides DC power, such as wind, hydro, and the like, and the power conditioners 122 are microinverters that convert the generated DC power to AC power that is commercial grid compliant and couple the AC power to a DG branch circuit 106. The generated AC power may be further coupled from the load center 112 to the loads 114 and/or to the power grid 124.

The DG 118 further comprises a plurality of power conditioners 122-N+1 . . . 122-N+M coupled to a plurality of energy storage/delivery devices 140-1 . . . 140-M (which may be referred to as energy storage/delivery devices 140) in a one-to-one correspondence; in some other embodiments one or more of the power conditioners 122-N+1 . . . 122-N+M may be coupled to multiple energy storage/delivery devices 140. The power conditioners 122-N+1 . . . 122-N+M are bidirectional microinverters that convert DC power from the RESs 140 to AC power that is coupled to the DG branch circuit 106, and convert AC power (e.g., from the power grid 124) to DC power that is stored in the energy storage/delivery devices 140. The energy storage/delivery devices 140 may be any type of device that can store energy and provide the stored energy, such as a battery.

The DG 118 operates as a microgrid when the power grid 124 is unavailable; in alternative embodiments the power grid 124 is not coupled to the load center 112 at all and the DG 118 operates as an off-grid microgrid. In some other embodiments, additional RESs 104/power conditioners 122 and/or devices 140/power conditioners 122 may be coupled to one or more additional branch circuits that are each coupled to the load center 112 via corresponding OCPDs.

The DG controller 116 communicates with the power conditioners 122 using power line communications (PLC), although additionally or alternatively other types of wired and/or wireless techniques may be used. The DG controller 116 may provide operative control of the DG 118 and/or receive data or information from the DG 118. For example, the DG controller 116 may be a gateway that receives data (e.g., alarms, messages, operating data and the like) from the power conditioners 122 and communicates the data and/or other information to a remote device or system, such as a master controller 128 communicatively coupled to the DG controller 116 via a communications network 126 (e.g., the Internet). The DG controller 116 may also send control signals to the power conditioners 122, such as control signals generated by the DG controller 116 or sent to the DG controller 116 by the master controller 128. The DG controller 116 is wirelessly coupled to the communications network 126, e.g., via a commercially-available router, although additionally or alternatively wired types of connectivity may be used. In certain embodiments, the master controller 128 may be cloud-based.

Each of the power conditioners 122-1 . . . 122-N+M comprises a controller 160-1 . . . 160-N+M, respectively, which may be referred to as controller 160 or power conditioner controller 160, that controls operation of the corresponding power conditioner 122. The controller 160 is described in more detail further below with respect to FIG. 2.

In accordance with one or more embodiments of the present invention, each of the power conditioners 122 autonomously detects an open circuit condition on the branch circuit 106 and shuts down upon detecting the condition. Such operation allows a branch-level switch or circuit breaker (for example, the OCPD 150) to be used as a shutdown initiation device. In some embodiments, the open circuit detection is accomplished by measuring the real/reactive current flow and determining if the corresponding phasor is left or right of an open circuit threshold boundary (i.e., whether the active and reactive current are outside of or within an expected operating region) as described further below with respect to FIG. 3. In other embodiments, other techniques may be used for detection of the open circuit.

Additionally, randomization may be used in the power conditioner shutdown to prevent all of the power conditioners 122 from shutting down at the same time. When the electrical load in the system 100 becomes light enough that the power conditioners 122 cannot distinguish between an open circuit and being very lightly loaded, the randomization allows a suitable number of the power conditioners 122 to remain operational to support the light load—as the power conditioners 122 start shutting down, those that have not shut down yet would naturally run at higher powers since there is still some load connected, resulting in a self-correction. As such, the rapid shutdown techniques described herein provide a scalable solution such that even under extremely lightly loaded conditions the system can still operate.

Figure 2:
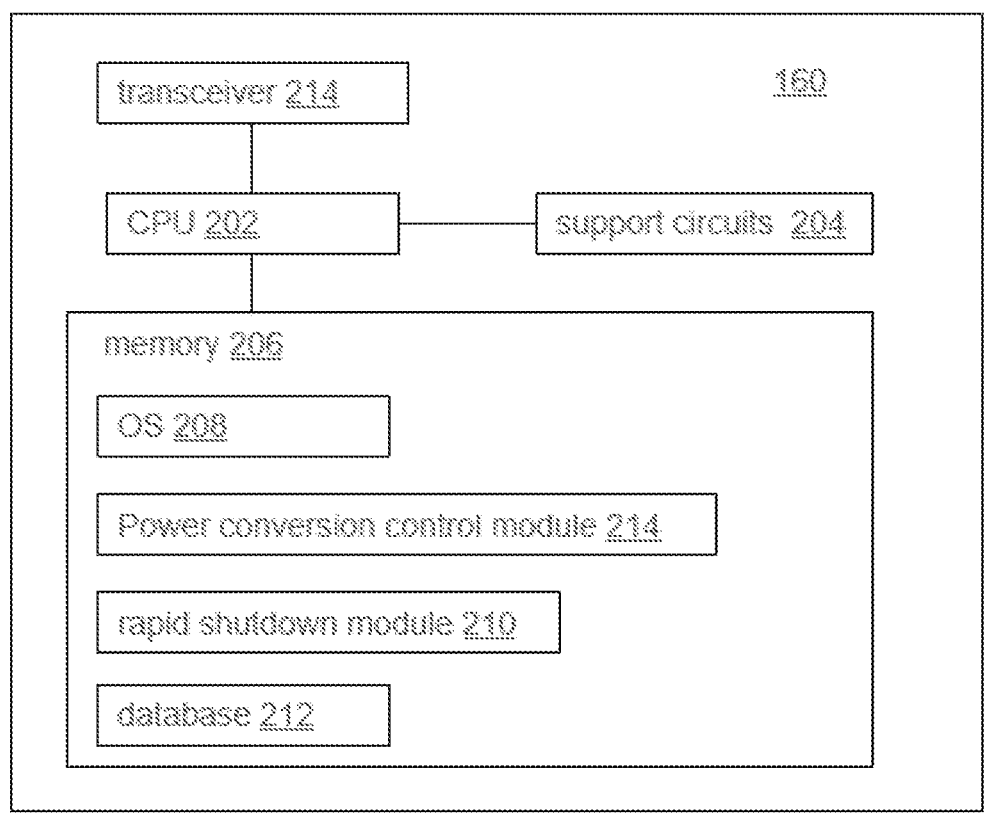
FIG. 2 is a block diagram of a power conditioner controller in accordance with one or more embodiments of the present invention.

FIG. 2 is a block diagram of a controller 160 in accordance with one or more embodiments of the present invention. The controller 160 comprises a transceiver 214, support circuits 204 and a memory 206, each coupled to a central processing unit (CPU) 202. The CPU 202 may comprise one or more conventionally available microprocessors or microcontrollers (e.g., a microcontroller comprising internal memory for storing controller firmware that, when executed, provides the controller functionality described herein), and/or may include one or more application specific integrated circuits (ASICs). The controller 160 may be implemented using a general-purpose computer that, when executing particular software, becomes a specific purpose computer for performing various embodiments of the present invention.

The transceiver 224 may be coupled to the power conditioner's output lines for communicating with the DG controller 116 and/or other power conditioners 122 using power line communications (PLC). Additionally or alternatively, the transceiver 224 may communicate with the DG controller 116 and/or other power conditioners 122 using other type of wired communication techniques and/or wireless techniques.

The support circuits 204 are well known circuits used to promote functionality of the CPU 202. Such circuits include, but are not limited to, a cache, power supplies, clock circuits, buses, input/output (I/O) circuits, and the like.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the controller 160 that can be supported by the CPU capabilities. In some embodiments, the OS 208 may be one of a number of commercially available operating systems such as, but not limited to, LINUX, Real-Time Operating System (RTOS), and the like.

The memory 206 stores various forms of application software, such as a power conversion control module 214 for controlling power conversion by the corresponding power conditioner 122, and a rapid shutdown module 210 which, when executed, detects an open circuit condition and shuts down the corresponding power conditioner 122 as described herein. Additionally, a database 212 is stored in the memory 206 for storing data related to the operation of the power conditioner 122 and/or the present invention. In various embodiments, one or more of the power conversion control module 215, the rapid shutdown module 210 and the database 212, or portions thereof, are implemented in software, firmware, hardware, or a combination thereof.

Figure 3:
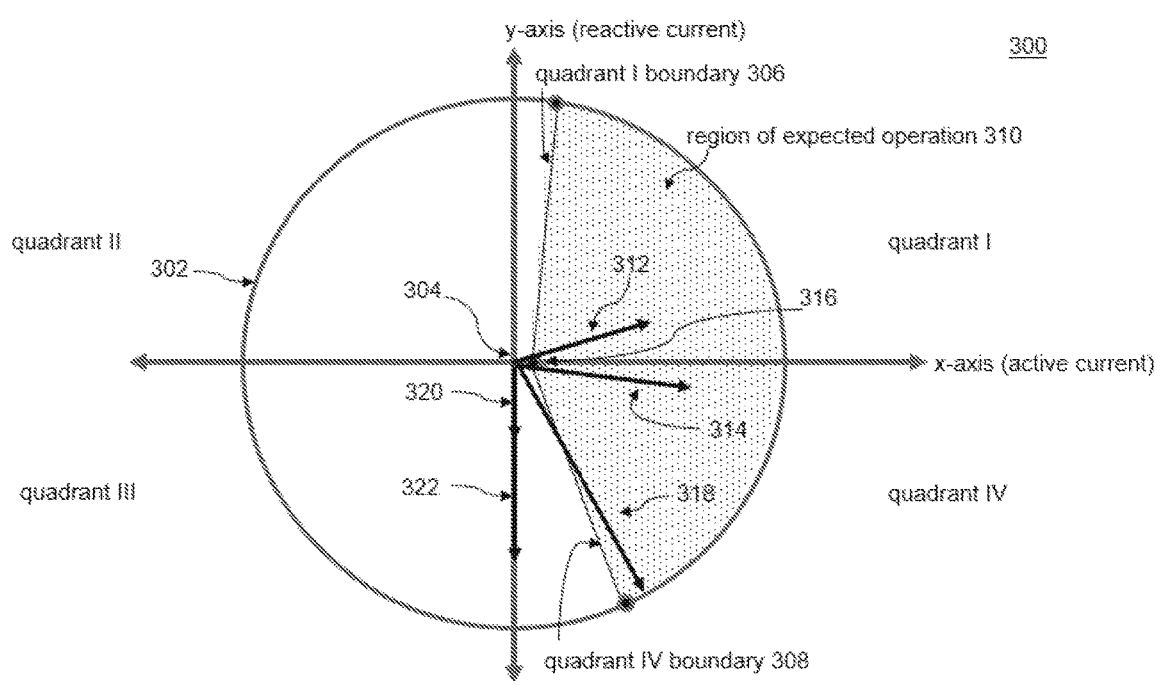
FIG. 3 is s a phasor diagram depicting a technique for detecting an open circuit condition for rapid shutdown in accordance with embodiments of the present invention.

FIG. 3 is a phasor diagram 300 depicting a technique for detecting an open circuit condition for rapid shutdown in accordance with embodiments of the present invention. In the phasor diagram 300, combined active and reactive current generated by a power conditioner 122 at a particular point in time is represented as a phasor and utilized as described below in determining an open circuit condition to trigger a power conditioner shutdown. In some alternative embodiments, power conditioner voltage or power rather than current may be represented as a phasor in the phase diagram 300 and used in determining an open circuit condition.

The phasor diagram 300 comprises a circle 302 centered around the origin 304 in a coordinate plane having x- and y-axes representing active and reactive current, respectively. Current generated by a power conditioner 122 (i.e., active and reactive current) at a particular point in time is represented as a phasor originating from the origin 304 and extending to a certain length in a direction based on the amount of real and reactive current generated at that point in time. The perimeter of the circle 302 represents the apparent current limit (i.e., maximum current); as such, the area within the circle 302 represents a region of possible operation for the power conditioner 122. Purely active current generated by the power conditioner 122 would be depicted as a phasor along the x-axis, while purely reactive current generated would be depicted as a phasor along the y-axis.

For example, purely active current generated by the power conditioner 122 and injected into the DG branch circuit 106 would be represented as a phasor extending from the origin 304 along the x-axis in the positive direction (i.e., positive active current). When the power conditioner 122 is coupled to an energy storage/delivery device 140 and is charging the device 140, the resulting current phasor would extend from the origin 304 along the x-axis in the negative direction (i.e., negative active current). Similarly, when the power conditioner 122 drives a purely inductive load, the resulting current phasor would extend from the origin 304 along the y-axis in the positive direction (i.e., positive reactive current); when the power conditioner 122 drives a purely capacitive load, the corresponding current phasor would extend along the y-axis in the negative direction (i.e., negative reactive current). A combination of active and reactive current generated by the power conditioner 122 would be represented as a phasor having length less than or equal to the radius of the circle 302 and a direction based on amounts of the active and the reactive current present.

For a single power conditioner 122 operating with no loading, and thus driving only itself, the power conditioner 122 runs with a reactive current due to its self-capacitance, for example as represented by a phasor 320 along the negative y-axis. In one or more alternative embodiments, the phasor 320 may represent the apparent power and may be on the order of 20 VAr.

During normal operation, i.e., a non-open circuit condition where the DG 118 is coupled to a power distribution grid, such as a commercial grid or a microgrid, loading occurs as various loads 114 (e.g., appliances, motors, and the like) are activated and deactivated. Under such conditions, a power conditioner 122 injecting current into the grid is expected to operate only in quadrants I and IV, with typically a low amount of reactive current, for example as shown by phasors 312 and 314 in quadrants I and IV, respectively.

In accordance with embodiments of the present invention, the phasor diagram 300 depicts an operating boundary for detecting on open circuit condition used to shut down the power conditioners 122. During an open circuit condition, the DG 118 is no longer coupled to any loads 114 and, as a result, the power conditioners 122 no longer generate active current. However, due to the capacitance of each power conditioner 122, the power conditioners 122 load one another with some reactive current. Since the amount of reactive current per power conditioner 122 is known, the location of the current phasor within the circle 302 can be used to indicate when a power conditioner 122 is operating in an open circuit condition. Upon detecting the open circuit condition, the power conditioner 122 can then de-energize.

In order to distinguish between open circuit conditions versus normal loading, a region of expected operation 310 is defined. When a current phasor falls within the region of expected operation 310, the power conditioner 122 is determined to be normally loaded; when the phasor falls outside of the region of expected operation 310, the power conditioner 122 is determined to be operating under open circuit conditions.

For a power conditioner 122 injecting current into the branch circuit 106, the region of expected operation 310 may be defined by a quadrant I boundary 306 and a quadrant IV boundary 308, where the quadrant I boundary 306 extends from a point 316 on the positive x-axis to a point on the circle 302 within the quadrant I, and the quadrant IV boundary 308 extends from the point 316 to a point on the circle 302 within the quadrant IV. The locations of the boundaries 306 and 308, which may also be referred to as an open circuit threshold or open circuit boundary, may be determined based on the expected reactive current due to the self-capacitance of the power conditioners 122 under no load. When the power conditioner's current phasor (i.e., the tip of the phasor) falls outside of the region of expected operation 310, i.e., to the left of the boundaries 306 and 308, the open circuit threshold is satisfied and the power conditioner 122 is determined to be in an open circuit condition. As a result, the power conditioner 122 can then shut itself down.

As more power conditioners 122 detect an open circuit condition and shut down, the amount of reactive current the remaining power conditioners 122 are loaded with increases. As a result, the current phasors for the remaining power conditioners 122 are pushed further to the left of the quadrant IV boundary 308, such as phasor 322 extending along the negative y-axis.

In various embodiments, a power conditioner 122 determined to be operating in an open circuit condition initiates shutdown following a delay, which may be randomized, in order to prevent false-positive open circuit detections. For example, during periods where the power conditioners 122 are lightly loaded, the amount of active current required from each of the power conditioners 122 may be low enough for the power conditioners 122 to incorrectly determine that they are in an open circuit condition and, as a result, shut down. By including a randomized shut-down delay, e.g., a power conditioner's current phasor must remain outside of the region of expected operation 310 for a certain period of time, some of the power conditioners 122 remain active while others shut down. As a result, capacitance and load are increased for the remaining power conditioners 122, driving their current phasors toward the region of expected operation 310, for example as shown by phasor 318, and increasing the likelihood that they will remain operating.

In one or more alternative embodiments, the region of expected operation 310 may encompass a larger or smaller region of the circle 302; for example, one or both of the boundaries 306 and 308 may be closer to the y-axis; additionally or alternatively, the point 316 from which the boundaries 306 and 308 extend may be further along the x-axis in the positive or negative direction.

In various embodiments, each power conditioner 122 may comprise a state machine used in determining, based on active and reactive current generated by the corresponding power conditioner 122, when the power conditioner 122 is operating within the region of expected operation 310 and should remain operational, or, when the power conditioner 122 is operating outside of the region of expected operation 310 and should be shut down. For example, in one or more embodiments, the rapid shutdown module 210 may comprise such a state machine. In certain embodiments a power conditioner 122 may perform a computation to determine whether the current phasor falls to the left or to the right of the open circuit threshold boundary formed by boundaries 306 and 308 (i.e., the rapid shutdown module 210 performs such a computation). In some embodiments, other techniques may be used to determine whether a power conditioner 122 is operating in an open circuit condition and should therefore be shut down.

Figure 4:
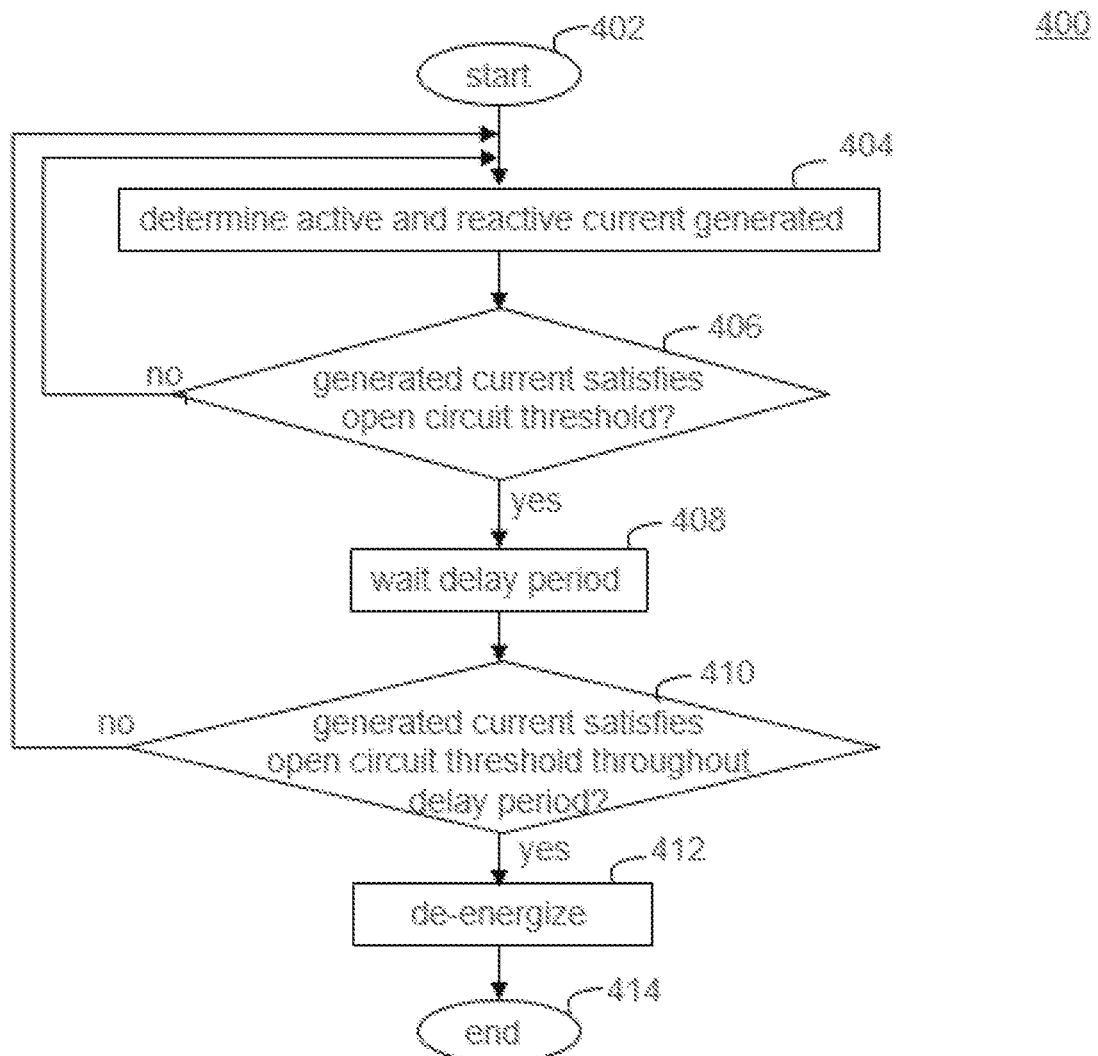
FIG. 4 is a flow diagram of a method for triggering a rapid shutdown of a power conditioner by detecting an open circuit condition in accordance with embodiments of the present invention.

FIG. 4 is a flow diagram of a method 400 for triggering a rapid shutdown of a power conditioner by detecting an open circuit condition in accordance with embodiments of the present invention. Any block, step, module, or otherwise described below may represent one or more instructions which can be stored on non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module. Of course, such blocks are presented for illustration purposes only and any one or more block, step, or module may be combined with any other, removed, split, or moved between the various systems and subsystems illustrated.

The method 400 enables each power conditioner 122 in the DG 118 to autonomously and independently implement a rapid shutdown (i.e., to shut down within, for example, 10 seconds of being disconnected from the branch circuit 106). In one or more embodiments, the method 400 is an implementation of the rapid shutdown module 210 described above. In certain embodiments, the method 400 may be implemented using a state machine, for example as part of the rapid shutdown module 210. In some embodiments, a computer readable medium comprises a program that, when executed by a processor, performs the method 400.

The method 400 starts at step 402 and proceeds to step 404. At step 404, the current (active and reactive) generated by the power conditioner 122 is determined. In some embodiments, the power conditioner 122 may measure generated active and reactive current; in other embodiments, active and reactive current levels commanded by the power conditioner 122 may be used. In still other embodiments, other techniques may be used for determining the generated active and reactive current. The level of generated current may be represented as a phasor as described above with respect to FIG. 3.

The method 400 proceeds to step 406. At step 406, a determination is made whether the current satisfies an open circuit threshold. In one or more embodiments, the open circuit threshold defined as the boundary of a region of expected operation for the power conditioner 122—i.e., the boundary of an operating region of the power conditioner 122 where current (active and reactive) generated is within a range that is expected under normal loading conditions (i.e., non-open circuit conditions), such as the boundary of the region of expected operation 310 (i.e., the boundaries 306 and 308) described above. In various embodiments, such as the embodiment described herein, the generated current satisfies the threshold when it falls outside the region of expected power conditioner operation. In some alternative embodiments, different criteria may be used to define whether the generated current satisfies the open circuit threshold.

If the result of the determination at step 406 is no, that the generated current does not satisfy the open circuit threshold (i.e., the generated current falls within the region of expected power conditioner operation), the method 400 returns to step 404. If the result of the determination at step 406 is yes, that the generated current does satisfy the open circuit threshold (i.e., the generated current falls outside of the region of expected power conditioner operation), the method 400 proceeds to step 408.

At step 408, the power conditioner waits for a delay period, which may be randomized. When the delay period ends, the method 400 proceeds to step 410, where a determination is made whether the generated current continued to satisfy the open circuit threshold throughout the delay period. If the result of the determination is no, that the generated current did not continue to satisfy the open circuit threshold throughout the delay period, then the method 400 returns to step 404. If the result of the determination is yes, that the generated current did continue to satisfy the open circuit threshold throughout the delay period, then the method 400 proceeds to step 412. At step 412, the power conditioner 122 de-energizes (i.e., shuts down), and the method 400 proceeds to step 414 where it ends. The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. A method for autonomous rapid shut-down of a power conditioner, comprising:
   determining an amount of active and reactive current generated by a power conditioner;
   determining whether the amount of active and reactive current satisfies an open circuit threshold; and
   initiating, when the amount of active and reactive current satisfies the open circuit threshold, deactivation of the power conditioner.

2. The method of claim 1, wherein the deactivation is initiated following a delay period.

3. The method of claim 2, wherein the length of the delay period is randomized.

4. The method of claim 2, wherein initiating the deactivation requires that the amount of active and reactive current satisfies the open circuit threshold throughout the delay period.

5. The method of claim 1, wherein the open circuit threshold is defined by a region of expected operation of the power conditioner, and wherein the amount of active and reactive current satisfies the open circuit threshold when the amount of active and reactive current is outside of the region of expected operation.

6. The method of claim 5, wherein the region of expected operation is determined based on expected reactive current due to self-capacitance of the power conditioner under no load.

7. The method of claim 1, wherein the amount of active and reactive current is expressed as a phasor when determining whether the amount of active and reactive current satisfies the open circuit threshold.

8. Apparatus for autonomous rapid shut-down of a power conditioner, comprising:
   a power conditioner controller, comprising at least one processor for (i) determining an amount of active and reactive current generated by the power conditioner, (ii) determining whether the amount of active and reactive current satisfies an open circuit threshold, and (iii) initiating, when the amount of active and reactive current satisfies the open circuit threshold, deactivation of the power conditioner following and throughout a delay period.

9. The apparatus of claim 8, wherein the length of the delay period is randomized.

10. The apparatus of claim 8, wherein the open circuit threshold is defined by a region of expected operation of the power conditioner, and wherein the amount of active and reactive current satisfies the open circuit threshold when the amount of active and reactive current is outside of the region of expected operation.

11. The apparatus of claim 10, wherein the region of expected operation is determined based on expected reactive current due to self-capacitance of the power conditioner under no load.

12. The apparatus of claim 8, wherein the amount of active and reactive current is expressed as a phasor when determining whether the amount of active and reactive current satisfies the open circuit threshold.

13. One or more non-transitory computer readable media for storing instructions that, when executed by at least one processor cause the at least one processor to perform a method for autonomous rapid shut-down of a power conditioner, the method comprising:
   determining an amount of active and reactive current generated by a power conditioner;
   determining whether the amount of active and reactive current satisfies an open circuit threshold; and
   initiating, when the amount of active and reactive current satisfies the open circuit threshold, deactivation of the power conditioner.

14. The one or more non-transitory computer readable media of claim 13, wherein the deactivation is initiated following a delay period.

15. The one or more non-transitory computer readable media of claim 14, wherein the length of the delay period is randomized.

16. The one or more non-transitory computer readable media of claim 14, wherein initiating the deactivation requires that the amount of active and reactive current satisfies the open circuit threshold throughout the delay period.

17. The one or more non-transitory computer readable media of claim 13, wherein the open circuit threshold is defined by a region of expected operation of the power conditioner, and wherein the amount of active and reactive current satisfies the open circuit threshold when the amount of active and reactive current is outside of the region of expected operation.

18. The one or more non-transitory computer readable media of claim 17, wherein the region of expected operation is determined based on expected reactive current due to self-capacitance of the power conditioner under no load.

* * * * *